US008401713B2

United States Patent
Kellum et al.

(10) Patent No.: US 8,401,713 B2
(45) Date of Patent: Mar. 19, 2013

(54) DETERMINING RELATIVE SPATIAL INFORMATION BETWEEN VEHICLES

(75) Inventors: Carroll C. Kellum, Cedar Falls, IA (US); Max H. Chiz, Shaw, MS (US); Hariharan Krishnan, Troy, MI (US); Jayendra S. Parikh, Rochester Hills, MI (US); Vikas Kukshya, Oak Park, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/220,762

(22) Filed: Aug. 30, 2011

(65) Prior Publication Data

US 2011/0313663 A1 Dec. 22, 2011

Related U.S. Application Data

(63) Continuation of application No. 11/029,890, filed on Jan. 5, 2005, now Pat. No. 8,041,469.

(51) Int. Cl.
*G05D 23/00* (2006.01)
*G06F 17/00* (2006.01)

(52) U.S. Cl. ............... 700/300; 700/1; 700/90; 700/91

(58) Field of Classification Search .............. 700/90, 700/91, 300; 707/706, 708, 711, 725, 733, 707/765, 767, 769, 771; 709/201, 206, 207, 709/210, 217, 219; 273/317.3, 317.4; 345/474, 345/642; 348/180, 181
See application file for complete search history.

(56) References Cited

U.S. PATENT DOCUMENTS

| | | | | |
|---|---|---|---|---|
| 4,747,064 A * | 5/1988 | Johnston | | 702/176 |
| 4,926,171 A * | 5/1990 | Kelley | | 340/961 |
| 5,339,075 A * | 8/1994 | Abst et al. | | 340/903 |
| 5,359,521 A * | 10/1994 | Kyrtsos et al. | | 701/470 |
| 5,555,503 A * | 9/1996 | Kyrtsos et al. | | 701/518 |
| 5,581,232 A * | 12/1996 | Tanaka et al. | | 340/435 |
| 5,722,051 A * | 2/1998 | Agrawal et al. | | 455/69 |
| 5,752,164 A * | 5/1998 | Jones | | 455/454 |
| 6,640,089 B1 * | 10/2003 | Kanaan et al. | | 455/67.16 |
| 6,952,181 B2 * | 10/2005 | Karr et al. | | 342/457 |
| 7,202,776 B2 * | 4/2007 | Breed | | 340/435 |
| 7,274,940 B2 * | 9/2007 | Kyperountas et al. | | 455/456.1 |
| 7,373,152 B2 * | 5/2008 | Oesterling | | 455/456.1 |
| 7,400,956 B1 * | 7/2008 | Feller et al. | | 701/41 |
| 2002/0126647 A1 * | 9/2002 | Schilling | | 370/344 |
| 2003/0050878 A1 * | 3/2003 | Rappaport et al. | | 705/34 |
| 2003/0104831 A1 * | 6/2003 | Razavilar et al. | | 455/522 |
| 2003/0146871 A1 * | 8/2003 | Karr et al. | | 342/457 |
| 2003/0189906 A1 * | 10/2003 | Belcea | | 370/318 |
| 2003/0222820 A1 * | 12/2003 | Karr et al. | | 342/457 |
| 2004/0193374 A1 * | 9/2004 | Hac et al. | | 701/301 |
| 2005/0143100 A1 * | 6/2005 | Shi et al. | | 455/456.6 |
| 2005/0273258 A1 * | 12/2005 | MacNeille et al. | | 701/300 |
| 2006/0239202 A1 * | 10/2006 | Kyperountas et al. | | 370/252 |
| 2008/0167049 A1 * | 7/2008 | Karr et al. | | 455/456.2 |
| 2008/0309550 A1 * | 12/2008 | Sairo et al. | | 342/357.1 |

* cited by examiner

*Primary Examiner* — Ian Jen
(74) *Attorney, Agent, or Firm* — Quinn Law Group, PLLC

(57) ABSTRACT

A method for determining relative spatial information between a first vehicle and a second vehicle, the method including monitoring a communication channel at the first vehicle and receiving a current communication signal sent by the second vehicle on the communication channel. The current communication signal is received at a received power level. A relative position between the first vehicle and the second vehicle is calculated. Input to the calculating includes an actual or estimated transmitted power level, and the received power level.

20 Claims, 6 Drawing Sheets

US 8,401,713 B2

DETERMINING RELATIVE SPATIAL INFORMATION BETWEEN VEHICLES

CROSS-REFERENCE TO RELATED APPLICATIONS

This is a Continuation of Application of U.S. patent application Ser. No. 11/029,890 filed Jan. 5, 2005, which is incorporated herein, by reference, in its entirety.

BACKGROUND

The present disclosure relates generally to determining relative spatial information between vehicles and, in particular, to the use of wireless communication information and characteristics to determine a relative position between vehicles.

Many Active Safety (AS) and Driver Assistance (DA) systems require relative position with respect to neighboring vehicles in order to protect or assist the occupants of the equipped vehicle. For example, an adaptive cruise control system utilizes a range measurement from the equipped, or host, vehicle to the lead vehicle to assist the driver of the host vehicle in maintaining a distance between the vehicles. In the case of adaptive cruise control, the host vehicle is equipped with a radar, lidar, or vision sensor to detect vehicles ahead. Other systems may utilize sensors mounted on the sides of the vehicle or in the roadway to obtain a relative position measurement between vehicles. Another method of determining relative position between vehicles involves the exchange of each vehicle's location as determined by a Global Navigation Satellite System (GNSS) receiver. This method may be utilized when both vehicles are equipped with a GNSS device. Examples of GNSS devices include a Global Positioning System (GPS) and a Galileo receiver.

BRIEF DESCRIPTION

According to one aspect of the invention, a method is provided for determining relative spatial information between a first vehicle and a second vehicle using received signal strength (RSS). The method includes monitoring a communication channel at the first vehicle and receiving a current communication signal from the second vehicle on the communication channel. The current communication signal is received at a received power level. A distance between the first vehicle and the second vehicle is calculated. Input to the calculating includes, among other things, an actual or estimated transmitted power level, and the received power level.

In another aspect of the invention, a system is provided for determining relative spatial information between a first vehicle and a second vehicle. The system includes a receiver on the first vehicle for monitoring a communication channel. The system also includes a processor for executing instructions to implement a method. The method includes monitoring the communication channel and receiving a current communication signal from the second vehicle on the communication channel. The current communication signal is received at a received power level. A distance between the first vehicle and the second vehicle is calculated. Input to the calculating includes an actual or estimated transmitted power level, and the received power level.

In yet another aspect of the invention, a computer program product is provided for determining relative spatial information between a first vehicle and a second vehicle. The computer program product includes a storage medium readable by a processing circuit and storing instructions for execution by the processing circuit for performing a method. The method includes monitoring a communication channel and receiving a current communication signal from the second vehicle on the communication channel. The current communication signal is received at a received power level. A distance between the first vehicle and the second vehicle is calculated. Input to the calculating includes an actual or estimated transmitted power level, and the received power level.

In a further aspect of the invention, a method is provided for determining location information. The method includes receiving path loss model parameters at a first vehicle. The path loss model parameters correspond to one or more communication channels utilized by surrounding vehicles. Communication signals are received at the first vehicle. The communication signals are received via one or more of the communication channels from three or more of the surrounding vehicles. The communication signals include GNSS coordinates corresponding to each of the three or more surrounding vehicles. Range measurements between the first vehicle and the three or more surrounding vehicles are estimated. The estimating is responsive to the path loss model parameters and to estimated signal strengths associated with the communication signals. An algorithm is executed to determine estimated GNSS coordinates for the first vehicle. Input to the algorithm includes the GNSS coordinates corresponding to each of the three or more surrounding vehicles and to the range measurements.

BRIEF DESCRIPTION OF THE DRAWINGS

Referring now to the figures, which are meant to be exemplary embodiments, and wherein the like elements are numbered alike.

DETAILED DESCRIPTION

Exemplary embodiments of the present invention include a technique for utilizing transmit power, signal strength, Doppler shift and vehicle sensor information to obtain an estimated relative position between a host vehicle and one or more neighboring vehicles. The transmission power, signal strength and Doppler shift are obtained from a wireless communication device on the host vehicle without requiring any special cooperation from the neighboring vehicles. To implement exemplary embodiments of the present invention, the host vehicle is equipped with a wireless communication device that can estimate received signal strength (RSS) and optionally, the Doppler shift of a signal received from another communication device on a neighboring vehicle. Information transmitted across the wireless communication link may be utilized to improve the relative positioning estimates between the host vehicle and one or more neighboring vehicles.

When two devices communicate wirelessly, the transmitter in a wireless communication device sends data at a known transmission power level, $P_t$, and the receiver in a wireless communication device receives the data at a measured received power level, $P_r$. A free space loss wireless communication model, or equation, such as $$P_t/P_r = (4\pi d/\lambda)^p,$$

may be utilized to indicate that the ratio between the two power levels is a function of distance, d, and path loss exponent, p, for a fixed (and known) wavelength, $\lambda$. In exemplary embodiments of the present invention, vehicles with wireless communication devices utilize a free space loss wireless communication model, such as the one above with p=2, to estimate the distance between a host vehicle and a neighboring vehicle. The transmitting communication device transmits information at the fixed transmission power level, $P_t$. The receiving communication device estimates the distance between the vehicles based on the transmission power level, $P_t$, and the received power level, $P_r$, according to a free space loss equation such as the one above. Any wireless communication path loss model may be utilized (e.g., a free-space path loss communication model and a two-ray path loss communication model) by exemplary embodiments of the present invention to determine an estimated distance, or relative position, between the vehicles.

Figure 1:
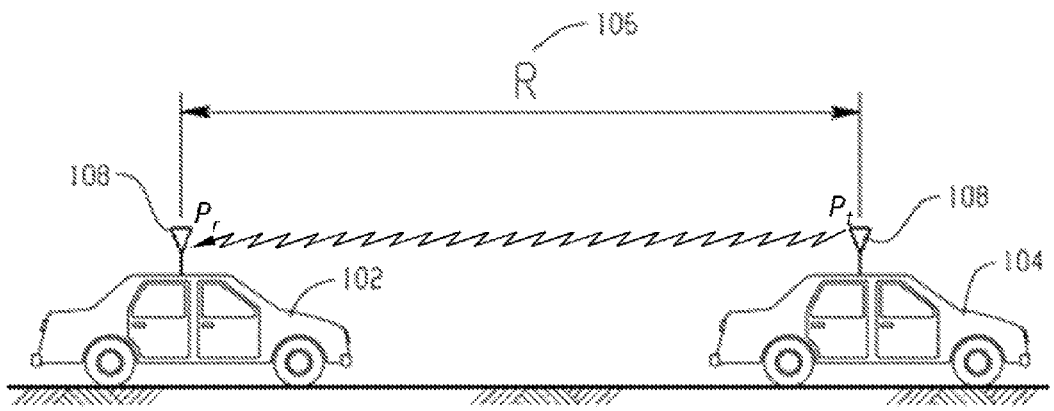
FIG. 1 is a block diagram of a host vehicle and a neighboring vehicle in accordance with exemplary embodiments of the present invention.

FIG. 1 depicts a host vehicle 102 (or first vehicle) and a neighboring vehicle 104 (or second vehicle), both containing a wireless communication device 108. The host vehicle 102, as referred to herein, is the vehicle that is calculating the range, and the neighboring vehicle 104 is the vehicle that is continuously transmitting a communication signal that is received at the host vehicle 102. The communication signals may be classified as earlier communication signals (that were received at an earlier point it time), current communication signals (that were the last received communications signals) and later communication signals (that will be received at a point in time in the future). In exemplary embodiments of the present invention, the host vehicle 102 performs both the host vehicle processing described herein (e.g., calculating a range) as well as the neighboring vehicle processing (e.g., transmitting a communication signal) described herein. Similarly, the neighboring vehicle 104 may perform both the host vehicle processing described herein (e.g., calculating a range) as well as the neighboring vehicle processing (e.g., transmitting a communication signal) described herein. The host vehicle processing may be performed by hardware and/or software that is located within and/or remote to the host vehicle 102. Similarly, the neighboring vehicle processing may be performed by hardware and/or software that is located within and/or remote from the neighboring vehicle 104. Data from the wireless communication devices 108 is utilized to estimate a range 106 (or distance) between the host vehicle 102 and the neighboring vehicle 104. The host vehicle 102 may be an automobile, an over the highway tractor, a boat, a motorcycle, a pedestrian, and the like. Similarly, the neighboring vehicle 104 may be an automobile, an over the highway tractor, a boat, a motorcycle, a pedestrian, and the like.

The host vehicle 102 and the neighboring vehicle 104 both include a wireless communication device 108. The wireless communication devices 108 may include transmitters and receivers and may be implemented by any device capable of wireless communications including, but not limited to wireless fidelity (WiFi), infrared (IR), radio frequency (RF) and any Institute of Electrical and Electronics Engineers (IEEE) 802.11 technology. The host vehicle 102 and the neighboring vehicle 104 may utilize different communication devices as long as the devices have the capability of communicating in a wireless fashion with each other.

In a multi-channel communications environment, the host vehicle 102 and neighboring vehicles 104 may switch from a control channel to a service channel to exchange messages enabling the estimation of range (or relative position) between vehicles. This switch may be required due to the communication protocol being followed or may be done to improve the accuracy and reliability of the power or range estimates. In systems where vehicles are periodically broadcasting information, channel switching or special messages specifically for the purposes of ranging may not be required or may be limited in number as long as the host vehicle 102 monitors the channel used for broadcasting.

Figure 2:
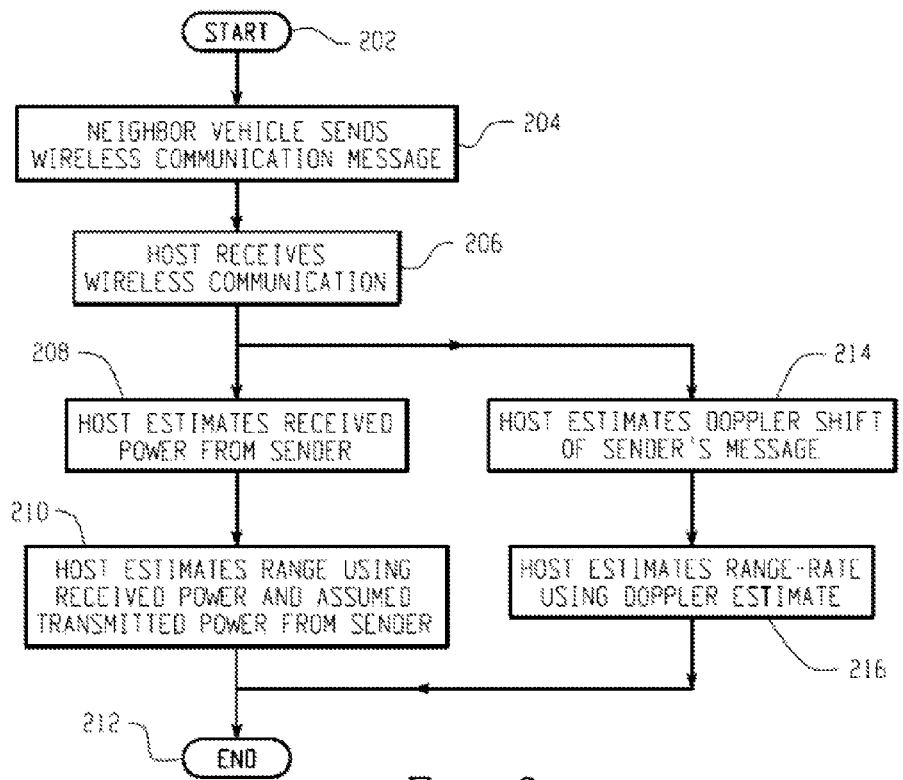
FIG. 2 is a process flow that may be utilized by exemplary embodiments of the present invention to determine relative spatial information between vehicles.

FIG. 2 depicts a process flow utilized by exemplary embodiments of the present invention where the host vehicle 102 estimates range based solely on the received power level and an assumption of the transmitted power level from a neighboring vehicle 104. This scenario requires no cooperation from the neighboring vehicle 104 (beyond transmitting a signal) and provides an estimate of the range 106 between the host vehicle 102 and the neighboring vehicle 104 for transmissions received at the host vehicle 102 from the neighboring vehicle 104. The calculation of the range 106 may be augmented by a range-rate calculation when the host vehicle 102 estimates the Doppler shift of the message from the neighboring vehicle 104. Over a number of samples, the confidence in the range and/or range-rate estimates may increase, compensating for the effects of fading in a mobile environment. At step 202, the process starts and at step 204 a neighboring vehicle 104 sends a wireless communication signal via a transmitter in the wireless communication device 108 located on the neighboring vehicle 104. At step 206, a receiver in the wireless communication device 108 on the host vehicle 102, that has been monitoring a communication channel, receives the current wireless communication signal from the neighboring vehicle 104. The current wireless communication signal is received by the receiver in the wireless communication device 108 on the host vehicle 102 at a received power level. After step 206 is completed, steps 208 and 214 are initiated (in parallel as depicted in FIG. 2 or in serial).

At step 208 in FIG. 2, the host vehicle 102 estimates the received power level of the current communication signal and at step 210, the host vehicle 102 estimates the range 106 (or relative position) between the neighboring vehicle 104 and the host vehicle 102. An integrated circuit, or other computing device, on the host vehicle 102 estimates the range 106 using the received power level and the assumed transmitted power level of the sending neighboring vehicle 104 (e.g., using a free space loss wireless communication model). In alternate exemplary embodiments of the present invention, an actual transmission power level is utilized when the neighboring vehicle 104 transmits the transmitted power level to the host vehicle 102 and the host vehicle 102 has the capability of translating a message from the neighboring vehicle 104 when the message is encoded in a message set. The neighboring vehicle 104 may encode the transmitted power in the transmission used by the host vehicle 102 for calculation of range. Alternatively, the neighboring vehicle 104 may encode the transmitted power in transmissions before or after the transmission used by the host vehicle 102 for ranging. These transmissions may occur on a different communication channel than the transmission being used by the host for ranging. At step 214, the host vehicle 102 estimates the Doppler shift of the current wireless communication signal from the neighboring vehicle 104. At step 216, the host vehicle 102 estimates a range rate using the Doppler estimate. Once steps 210 and 216 are completed, the loop ends at step 212 and processing continues at step 204 when the neighboring vehicle 104 transmits another wireless communication signal.

Figure 3:
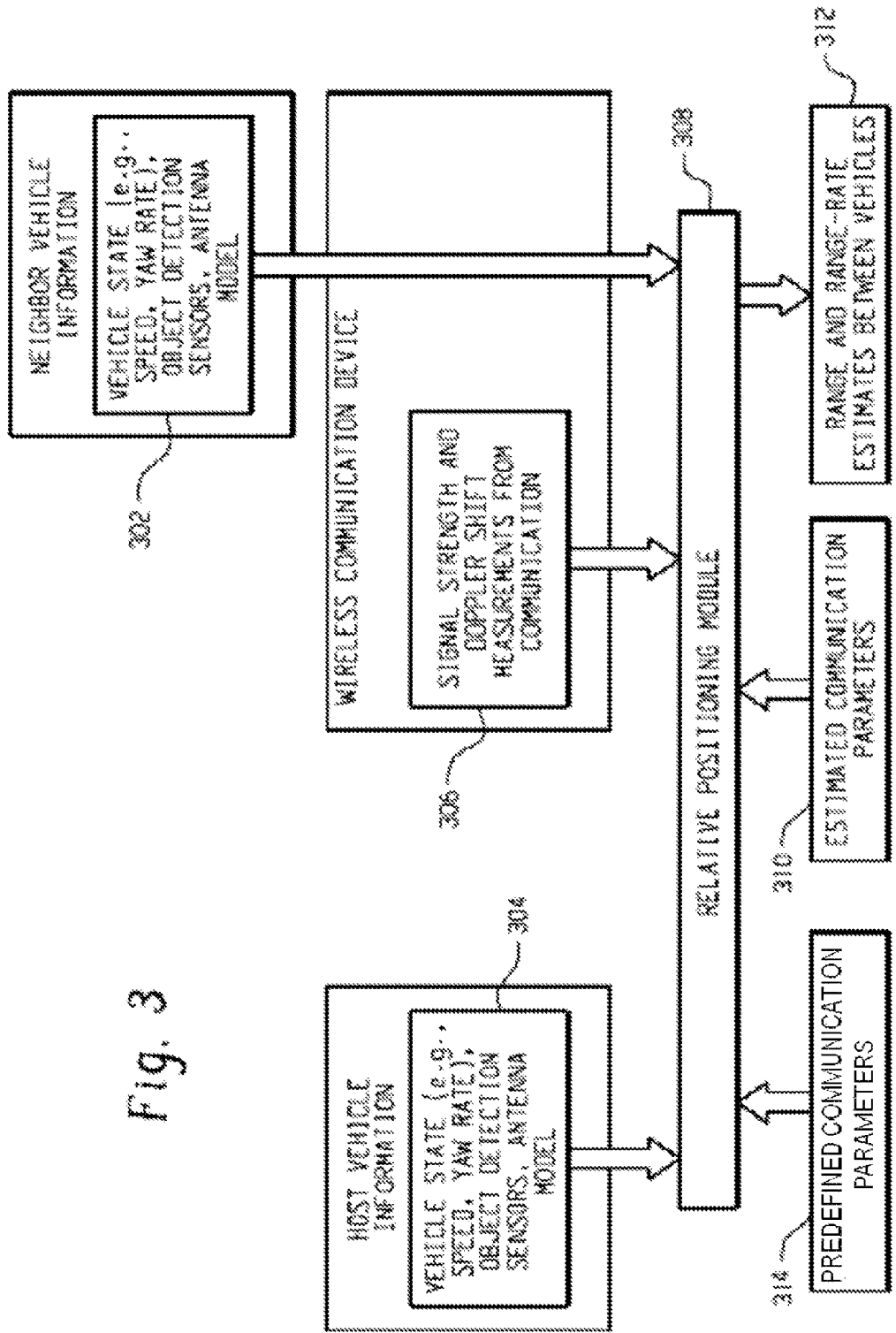
FIG. 3 is a process flow that may be utilized by alternate exemplary embodiments of the present invention to determine relative spatial information between vehicles.

FIG. 3 depicts a process flow for alternate exemplary embodiments of the present invention. The process depicted in FIG. 3 includes a relative positioning module 308. The relative positioning module 308 utilizes host vehicle information 304 from the host vehicle 102 such as speed, yaw rate, object detection sensor data, antenna model and GNSS position, along with similar neighboring vehicle information 302 from the neighboring vehicle 104 to improve the relative position estimates (e.g., range and range-rate estimates between vehicles 312). The neighboring vehicle 104 communicates its communication characteristics, such as antenna model and transmission power level, to the host vehicle 102 in order to improve the relative spatial determination. The relative positioning module 308 utilizes host vehicle information 304, neighboring vehicle information 302 and the estimated communication parameters 310 (e.g., wavelength, outside air temperature, estimated transmission power level) to create the range and range-rate estimates between vehicles 312. In addition, the host vehicle information 304 and neighboring vehicle information 302 may be utilized by the relative positioning module 308 to update the estimated communication parameters 310.

During times when the object detection sensors of the host vehicle 102 have reached their limitation, exemplary embodiments of the present invention may provide some level of relative positioning between the host vehicle 102 and the neighboring vehicle 104 using the estimated communication parameters 310 as input to the relative positioning module 308. At system start up, default values may be entered into the estimated communication parameters 310 including sensed conditions such as outside air temperature, humidity, and vehicle speed as well as other communication parameters utilized by the relative positioning module 308. Relative positioning between the host vehicle 102 and the neighboring vehicle 104 may be improved when the object detection sensors are functioning at an optimum level.

When the object detection sensors are functioning at an optimum level, information from the object detection sensors relating to the range and range-rate between vehicles will be utilized to calculate the range and range-rate estimates between vehicles 312. In exemplary embodiments of the present invention, the results of this calculation will be compared to the results of the estimation that took place in step 210 and utilized to improve the estimation of the relative position between the vehicles. In addition, the range and range rate information from the object detection sensors may be utilized by the relative positioning module 308 to update the estimated communication parameters 310. These estimated communication parameters 310 may be fixed or dependent on time, location, vehicle, etc.

When the object detection sensors are not functioning at an optimal level (e.g., extreme glare into cameras, limited field of view for radar), steps 210 and 216 in FIG. 2 will be able to estimate range and range-rate using models in the relative positioning module 308 that utilize the estimated communication parameters 310 estimated during earlier operation.

As depicted in FIG. 3, the relative spatial information that is calculated based on the transmitted and received power levels, may be utilized as a back up or supplement to other relative position determination or object detection systems. In this manner, the Active Safety (AS) and/or Driver Assistance (DA) systems may continue to operate for some period of time, providing the same or a sublevel of information, in the event that other relative position determination or object detection systems are not fully functioning or are limited in their ability. In addition, the calculated relative spatial information may be utilized to verify that the other relative position determination or object detection systems are providing valid data.

Other exemplary embodiments of the present invention include the ability to filter estimates over time in order to bound relative spatial position conclusions based on previous estimates. In this manner, an estimated spatial position that is an anomaly may be discarded or used with a lower confidence value. In addition, previous relative positions at previous points in time may be utilized to predict future relative positions.

In other exemplary embodiments of the present invention, the host vehicle 102 and the neighboring vehicle 104 transmit estimated relative spatial information to each other so that they may observe each other's individual estimates. In this manner, the host vehicle 102 may verify its estimated relative spatial information by comparing it to the estimated relative spatial information received from the neighboring vehicle 104. Similarly, the neighboring vehicle 104 may verify its estimated relative spatial information by comparing it to the estimated relative spatial information received from the host vehicle 102. Further, advanced filters may be utilized to estimate heading differences and vehicle maneuvers.

Other exemplary embodiments of the present invention include the ability to utilize information from multiple neighboring vehicles 104 to improve the range and range rate estimates made by the host vehicle 102. For example, GNSS-equipped (GNSS-E) vehicles in a cluster of vehicles that includes other GNSS-E vehicles, and optionally, GNSS-unequipped (GNSS-U) vehicles may be utilized to determine estimated relative positions between the vehicles. As used herein, the term "cluster of vehicles" refers to any set or subset of vehicles located in a geographic area. The term "GNSS-E vehicle", as used herein, refers to a vehicle that has GNSS and/or inertial measurement and/or dead-reckoning systems and can determine its absolute GNSS coordinates using GNSS signals or can predict its current position coordinates using an inertial measurement and/or dead-reckoning system. In addition, the term "GNSS-U vehicle", as used herein, refers to a vehicle that at times may not be able to determine its position coordinates either due to lack of onboard GNSS systems, lack of access to GNSS signals and/or lack of inertial measurement and/or dead-reckoning systems.

Path loss exponent values are estimated for the wireless channel between all possible pairs of GNSS-E vehicles within direct communication range in a cluster of vehicles. In a given region, the path loss exponent values may not vary significantly. Therefore, these values may be utilized to provide an estimate of the wireless channel in the region and stored as an estimated communication parameter 310 for use by the relative positioning module 308. The GNSS-E vehicles transmit the path loss exponent values to GNSS-U vehicles. The GNSS-U vehicles use the path loss exponent values as input to the relative positioning module 308 for characterizing the wireless channel between them and the neighboring GNSS-E vehicles. The relative positioning modules 308 utilize the path loss exponent values to determine the distance of a GNSS-U vehicle from other GNSS-E vehicles in the cluster and to determine approximations of GNSS coordinates relative to those of other GNSS-E vehicles in the cluster.

Some GNSS-E vehicles must be present in the cluster of vehicles so that the GNSS-U vehicles can utilize received signal strength (RSS) based ranging (e.g., using the path loss exponent values) and trilateration techniques to determine their GNSS coordinates relative to those of GNSS-E vehicles. Theoretically, a GNSS-U vehicle requires distance-of-separation values from only three non-collinear GNSS-E vehicles to accurately determine its GNSS coordinates. However, because the distance values may have errors, a GNSS-U vehicle may be able to more accurately determine its GNSS coordinates by using ranging measurements from more than three non-collinear GNSS-E vehicles.

The wireless communication path loss model described previously may be enhanced by more detailed characterizations of the wireless channel between two vehicles so that a relationship between the RSS values and the inter-vehicular distances can be established. Vehicles may utilize a database of predefined communication parameters 314 including path loss models and/or path loss exponents for a range of operational environments (such as rural, semi-urban, urban, dense urban, etc). The database 314 is accessible by the host vehicle processing described herein and the database 314 may be located within the vehicle or remote from the vehicle. Alternatively, portions of the database 314 may be located on the vehicle and other portions located remote to the vehicle. The relative positioning module 308 can then use these models to derive a relative position estimate. In a cluster of mobile vehicles, it may be more difficult for a GNSS-U vehicle to characterize the surrounding wireless channel. However, pairs of GNSS-E vehicles can do so easily. Exemplary embodiments of the present invention use pairs of GNSS-E vehicles to characterize the wireless channel in the cluster and to broadcast this information to all the GNSS-U vehicles. Based on this real-time characterization of the wireless channel in the cluster, GNSS-U vehicles in the cluster may be able to establish a more accurate relationship for determining relative distances using signal strengths of the received information packets.

Figure 4:
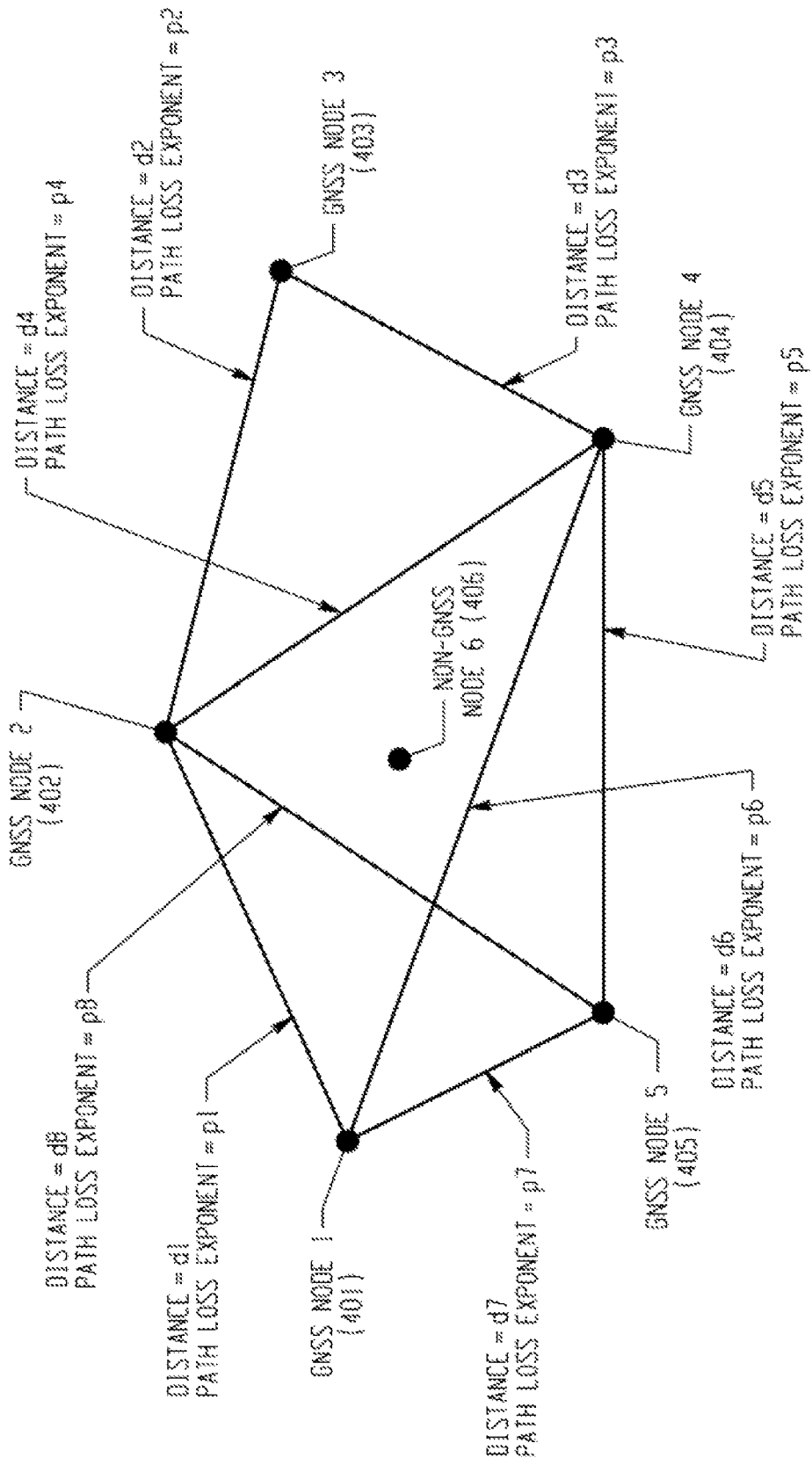
FIG. 4 is a block diagram of a cluster of vehicles in accordance with exemplary embodiments of the present invention.

FIG. 4 is a block diagram of a cluster of vehicles that includes GNSS-E and GNSS-U vehicles in accordance with exemplary embodiments of the present invention. FIG. 4 includes five GNSS-E nodes (node 1 401, node 2 402, node 3 403, node 4 404 and node 5 405) each corresponding to a location of a different GNSS-E vehicle and one GNSS-U node (node 6 406) corresponding to the location of a GNSS-U vehicle. In addition, FIG. 4 indicates a distance (e.g., d1, d2 and d3) and a path loss exponent value (e.g., p1, p2 and p3) between each pair of GNSS-E nodes. In exemplary embodiments of the present invention, all the GNSS-E vehicle pairs in the cluster within direct communication range utilize signal strength based ranging techniques as described above to estimate the path loss exponent values as depicted in FIG. 4. The host vehicle 102 depicted in FIG. 1 may be any or all of the GNSS-E vehicles or any or all of the GNSS-U vehicles. Similarly, the neighboring vehicle 104 depicted in FIG. 1 may be any or all of the GNSS-E vehicles or any or all of the GNSS-U vehicles.

Figure 5:
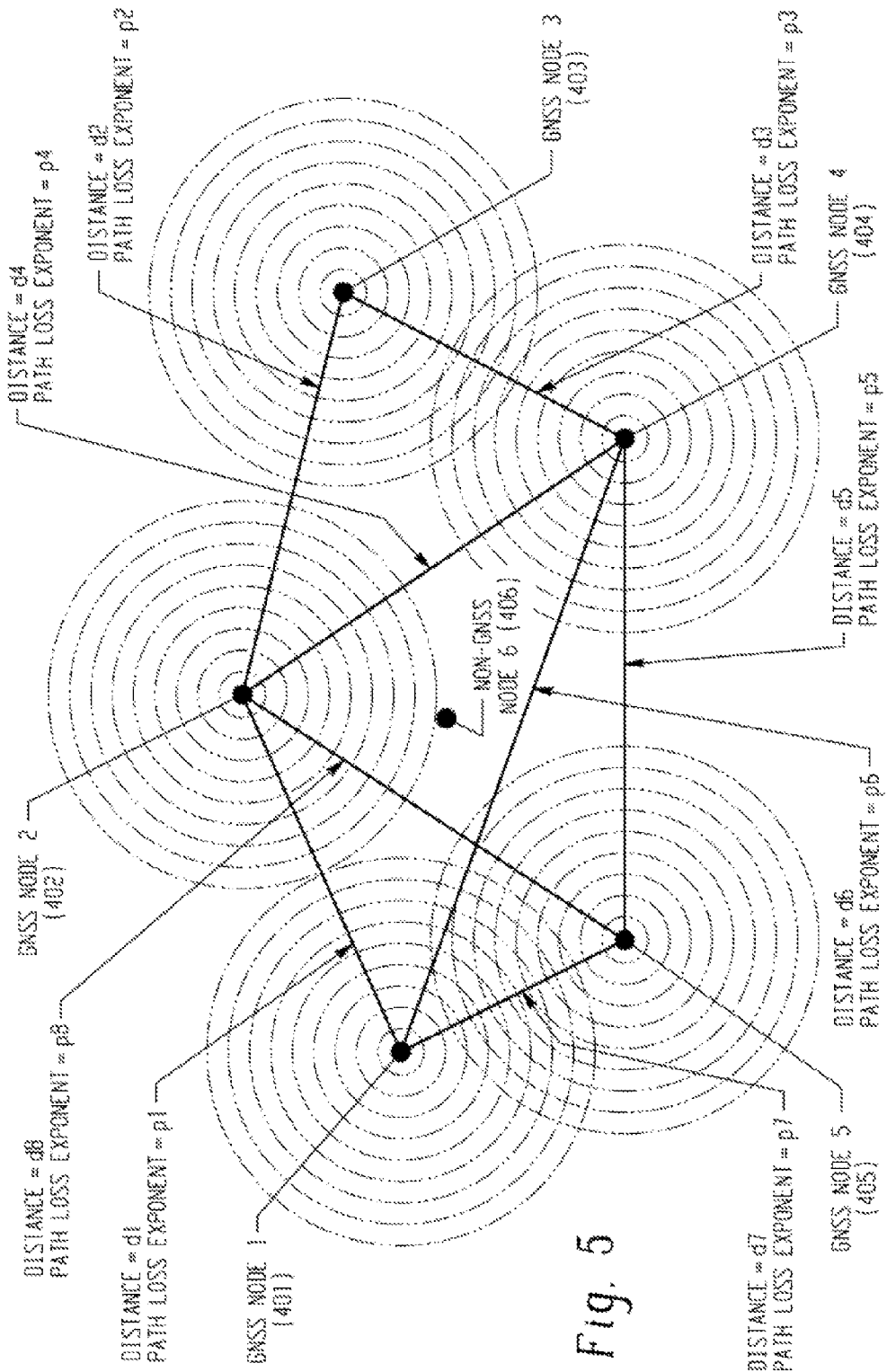
FIG. 5 is a block diagram of a cluster of vehicles transmitting distance and path loss exponents in accordance with exemplary embodiments of the present invention.

FIG. 5 is a block diagram of a cluster of vehicles transmitting distance and path loss exponent values in accordance with exemplary embodiments of the present invention. Once the GNSS-E vehicle pairs in the cluster within direct communication range are identified, the GNSS-E vehicles transmit information packets containing their current GNSS coordinates and power of the transmitted packet at the output at the antennae on the vehicle. Note that the vehicles need not transmit just one information packet but instead may transmit a number of packets to allow averaging out of small scale fading effects. The information packets are broadcast to both GNSS-E and GNSS-U vehicles in the cluster.

All of the GNSS-E vehicles in the cluster exchange information packets and determine distances of separation between themselves as well as path loss exponent values for individual local wireless channels. Upon receipt of the information packets by the GNSS-E vehicles in the cluster, they calculate the distances between them and the transmitting vehicle using respective GNSS coordinates. The total path loss is calculated for each pair of GNSS-E vehicles in the cluster. Path loss can be derived as the transmission power level, $P_t$, minus the received power level, $P_r$. Next, the receiving GNSS-E vehicles calculate the path loss exponent values (using previously calculated distance and path loss values) for the wireless channel between them and the transmitting vehicle. Generally, in a given region, the path loss exponent values may not vary significantly. Thus, these values can provide an estimate of the wireless channel within the cluster.

Figure 6:
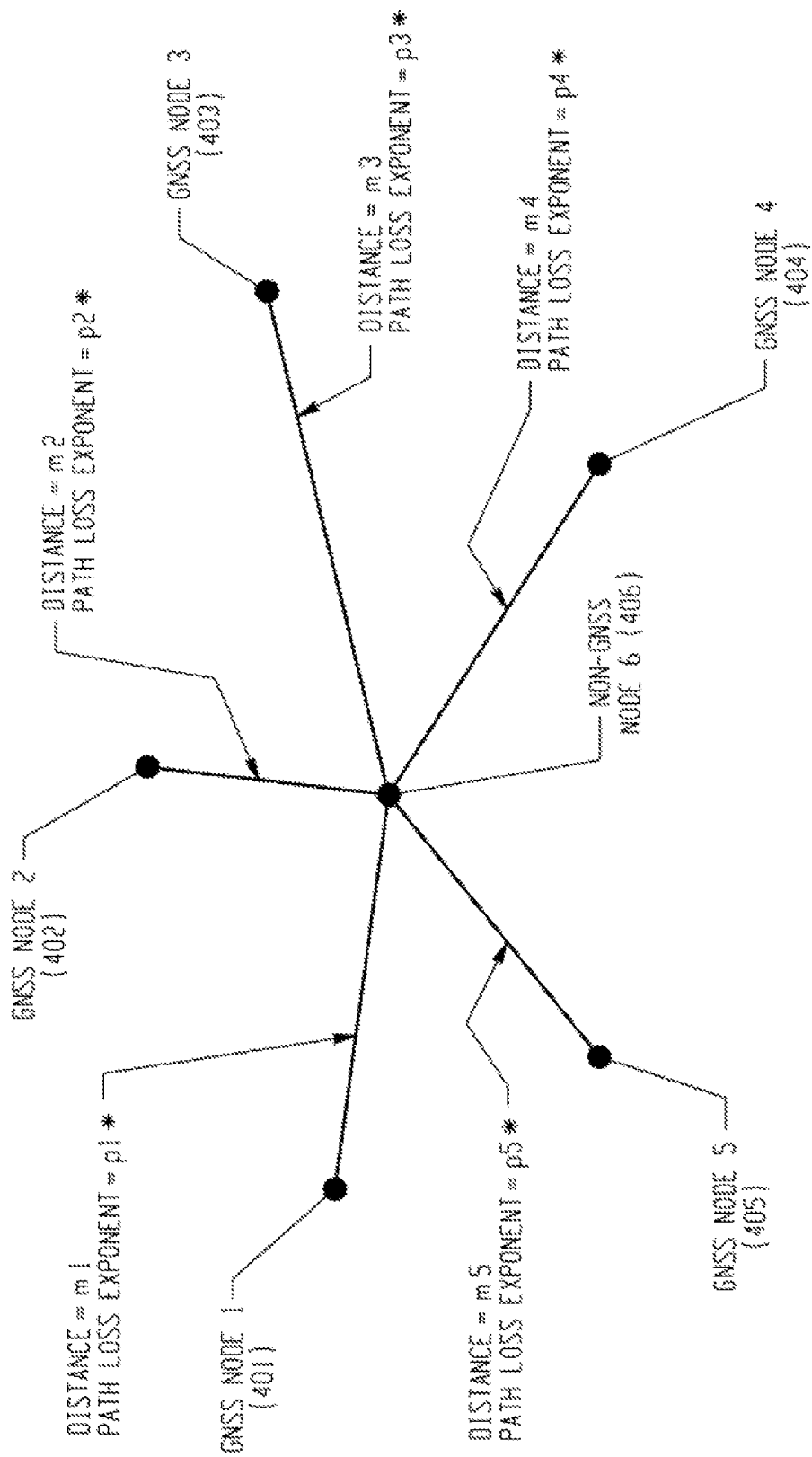
FIG. 6 is a block diagram of a GNSS-unequipped (GNSS-U) vehicle in a cluster of vehicles calculating a distance of separation from other vehicles within the cluster according to exemplary embodiments of the present invention.

The receiving GNSS-E vehicles broadcast these path loss exponent values (along with other pertinent information such as the GNSS coordinates, orientations, and heading of each individual pairs of vehicles) to GNSS-U vehicles within the cluster. The GNSS-U vehicles may establish a database of path loss exponent values that are continuously updated over time. FIG. 6 is a block diagram of a GNSS-U vehicle in a cluster of vehicles calculating a distance of separation from other vehicles within the cluster according to exemplary embodiments of the present invention. Based on the signal strengths of information packets received from neighboring GNSS-E vehicles and the onboard database of path loss exponent values, the GNSS-U vehicle at node 6 406 calculates distances of separation between itself and neighboring GNSS-E vehicles.

Figure 7:
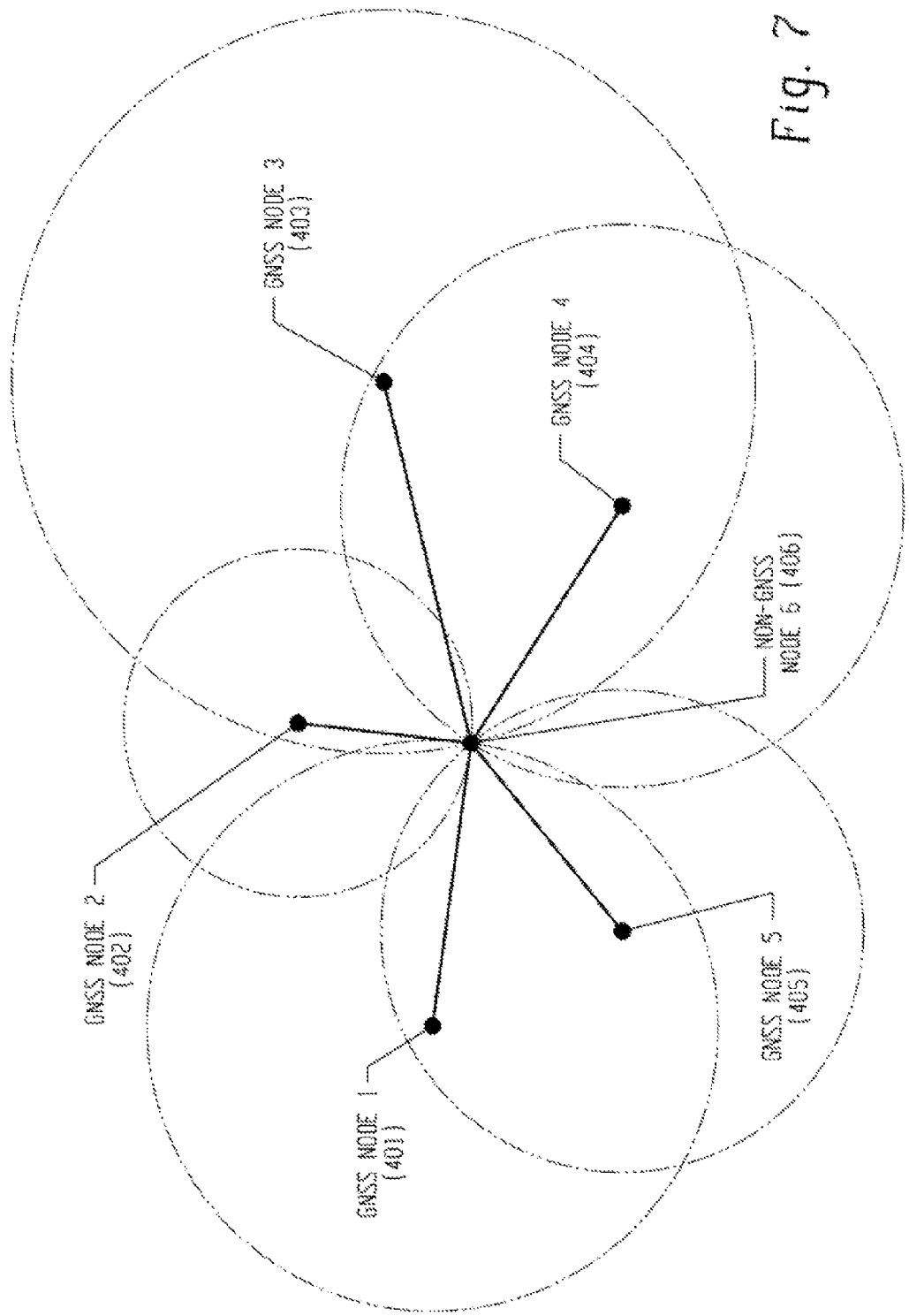
FIG. 7 is a block diagram of a GNSS-U vehicle in a cluster of vehicles calculating GNSS coordinates of the GNSS-U vehicle in accordance with exemplary embodiments of the present invention.

FIG. 7 is a block diagram of a GNSS-U vehicle in a cluster of vehicles calculating GNSS coordinates of the GNSS-U vehicle in accordance with exemplary embodiments of the present invention. The GNSS-U vehicles can now identify GNSS-E vehicles in the cluster within direct communication range (so as to determine their GNSS coordinates relative to the GNSS coordinates of GNSS-E vehicles using RSS based ranging and trilateration) and use the onboard database of path loss exponent values to determine appropriate path loss exponents for wireless channels between them and each of their neighboring GNSS-E vehicles. The GNSS-U vehicle may perform trilateration (circles with positions of GNSS-E vehicles as center and distances of separation with GNSS-less vehicle as radii) to determine its position relative to GNSS coordinates of its neighboring GNSS-E vehicles. Ideally, the point of intersection of all the circles, as shown in FIG. 7, gives the GNSS coordinates of the GNSS-U vehicle. When the circles do not intersect at one point, techniques known to those skilled in the art will be applied to resolve the GNSS coordinates.

Alternate exemplary embodiments may allow GNSS-E vehicles to become GNSS-U vehicles during outages and maintain relative spatial measurement accuracy. If a cluster of GNSS-E vehicles have over time estimated path loss exponents, the same vehicles may use the previous estimates of path loss exponents during a period of time when GNSS information may not be available (e.g., tree cover or vehicle entry into a tunnel) in any or all of the vehicles. The use of previous path loss exponent measurements can provide a better path loss model for determining relative spatial information between the set of vehicles.

The alternate exemplary embodiment described in reference to FIGS. 4 to 7 may be utilized when the host vehicle 102 and neighboring vehicle 104 are part of a cluster of vehicles that contain GNSS devices. One, both or neither of the host vehicle 102 and the neighboring vehicle 104 are required to have a GNSS device to use this alternate embodiment. Using the predicted path loss exponent values may result in a better estimate of the relative position of the neighboring vehicle 104 with respect to the host vehicle 102 when compared to the path loss models described in reference to FIGS. 2-3. By using the predicted path loss exponent values (that may be more accurate than free-space path loss models, two ray path loss models, or other generalized path loss models), the GNSS-U vehicles derive a relationship between the signal strength of received packet(s) and the inter-vehicular distances. The GNSS-U vehicles then use this relationship to predict a distance between them and the transmitting GNSS-E vehicles. In this manner, the overall performance of the RSS based ranging technique may be improved. This may directly translate into better performance of AS and DA systems, and indirectly translate to earlier introduction of the collision warning application in the vehicles.

Exemplary embodiments of the present invention may be utilized to increase the accuracy of RSS based ranging measurements and thus lower the optimum number of ranging measurements required by GNSS-U vehicles to determine GNSS coordinates. Also, since achieving a higher penetration level for GNSS-E vehicles may not always be feasible, by lowering the requirements on the penetration level of GNSS-E vehicles, exemplary embodiments of the present invention may be utilized to facilitate earlier adoption of various AS and DA applications.

Exemplary embodiments of the present invention may be utilized to determine relative spatial information between vehicles using a vehicle centered approach that focuses on ranging between two points (the host vehicle 102 and the neighboring vehicle 104). In addition, a message set that is standard to vehicle communication systems is utilized and therefore, no specialized message set is required. The relative spatial information may be utilized to replace and/or augment existing range sensors such as radar, lidar and GNSS.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A non-transitory computer-readable medium tangibly containing computer-executable instructions for determining relative spatial information between a first vehicle and a second vehicle, wherein execution of the instructions by a processing circuit causes the processing circuit to execute the steps of:
monitoring a communication channel at the first vehicle;
receiving on the communication channel at the first vehicle a communication signal originating from the second vehicle at a fixed power level, wherein the communication signal as received defines a current communication signal at a received power level; and
calculating at the first vehicle a relative position between the first vehicle and the second vehicle, wherein input to the calculating includes an actual or estimated transmitted power level and the received power level.

2. The non-transitory computer-readable medium as set forth in claim 1, wherein calculating the relative position includes using a wireless communication path loss model.

3. The non-transitory computer-readable medium as set forth in claim 1, wherein calculating the relative position is performed based on a past estimate of a wireless communication path loss model parameter.

4. The non-transitory computer-readable medium tangibly as set forth in claim 1, wherein calculating the relative position includes executing a free space path loss wireless communication model.

5. The non-transitory computer-readable medium tangibly as set forth in claim 1, wherein calculating the relative position includes executing a two-ray path loss wireless communication model.

6. The non-transitory computer-readable medium tangibly as set forth in claim 1, wherein one or more of an earlier communication signal, the current communication signal and a later communication signal includes an estimated path loss exponent value, and input to the calculating further includes the estimated path loss exponent value.

7. The non-transitory computer-readable medium tangibly as set forth in claim 1, wherein calculating the relative position between the first vehicle and the second vehicle is performed in conjunction with a Global Navigation Satellite System (GNSS) device.

8. The non-transitory computer-readable medium tangibly as set forth in claim 1, wherein execution of the instructions by the processing circuit causes the processing circuit to execute the step of transmitting the relative position to one or more of an Active Safety system and a Driver Assistance system.

9. The non-transitory computer-readable medium tangibly as set forth in claim 1, wherein execution of the instructions by the processing circuit causes the processing circuit to execute the step of determining a range rate associated with the current communication signal, wherein input to the determining includes a Doppler shift associated with the current communication signal.

10. The non-transitory computer-readable medium tangibly as set forth in claim 1, wherein:
input to calculating the relative position includes first vehicle information; and
the first vehicle information includes object detection sensor data.

11. The non-transitory computer-readable medium tangibly as set forth in claim 10, wherein calculating the relative position includes using the first vehicle information to filter or smooth distance estimates.

12. The non-transitory computer-readable medium tangibly as set forth in claim 1, wherein:
one or more of an earlier communication signal, the current communication signal and a later communication signal includes second vehicle information; and
the second vehicle information includes at least one of speed and yaw rate.

13. The non-transitory computer-readable medium tangibly as set forth in claim 12, wherein calculating the relative position includes using the second vehicle information to filter or smooth distance estimates.

14. The non-transitory computer-readable medium tangibly as set forth in claim 1, wherein one or more of an earlier communication signal, the current communication signal and a later communication signal includes an estimate of the distance as calculated by the second vehicle.

15. The non-transitory computer-readable medium tangibly as set forth in claim 1, input to calculating the relative position includes an estimated communication parameter.

16. The non-transitory computer-readable medium tangibly as set forth in claim 1, wherein one or more of an earlier communication signal, the current communication signal and a later communication signal includes an actual transmitted power level and the value of the estimated transmitted power level is set to the actual transmitted power level.

17. The non-transitory computer-readable medium tangibly as set forth in claim 1, wherein the first vehicle includes a Global Navigation Satellite System (GNSS) device for determining a GNSS position of the first vehicle and wherein the input to calculating the relative position further includes the GNSS position of the first vehicle.

18. The non-transitory computer-readable medium tangibly as set forth in claim 1, wherein the first vehicle has access to a database of predefined communication parameters and the input to calculating the relative position further includes one or more of the predefined communication parameters.

19. The non-transitory computer-readable medium tangibly as set forth in claim 1, wherein execution of the instructions by the processing circuit causes the processing circuit to execute the step of receiving the current communication signal by a receiver on the first vehicle.

20. The non-transitory computer-readable medium tangibly as set forth in claim 1, wherein execution of the instructions by the processing circuit causes the processing circuit to execute the step of determining a GNSS position of the first vehicle in response to the GNSS position of the second vehicle and to a path loss exponent value.

* * * * *